US010717488B2

(12) United States Patent
Tani et al.

(10) Patent No.: US 10,717,488 B2
(45) Date of Patent: Jul. 21, 2020

(54) CANISTER STRUCTURE FOR SADDLE RIDING VEHICLE

(71) Applicant: HONDA MOTOR CO., LTD., Tokyo (JP)

(72) Inventors: Yusaburo Tani, Wako (JP); Koji Nakamura, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 204 days.

(21) Appl. No.: 16/106,208

(22) Filed: Aug. 21, 2018

(65) Prior Publication Data

US 2019/0061859 A1    Feb. 28, 2019

(30) Foreign Application Priority Data

Aug. 30, 2017 (JP) .................. 2017-166008

(51) Int. Cl.
*F02M 33/02* (2006.01)
*B62K 11/02* (2006.01)
(Continued)

(52) U.S. Cl.
CPC .............. *B62J 35/00* (2013.01); *B62J 37/00* (2013.01); *F02M 25/0836* (2013.01);
(Continued)

(58) Field of Classification Search
CPC ...................................... B62J 35/00; B62J 37/00; B62K 11/00; B62K 15/03006; F02M 25/0836; F02M 25/0854
See application file for complete search history.

(56) References Cited

U.S. PATENT DOCUMENTS

| 2010/0243353 A1* | 9/2010 | Inaoka | B62J 37/00 180/68.3 |
| 2010/0243360 A1* | 9/2010 | Inaoka | B62J 37/00 180/225 |

(Continued)

FOREIGN PATENT DOCUMENTS

| JP | 2012-206530 | 10/2012 |
| JP | 2015-155245 A | 8/2015 |

(Continued)

OTHER PUBLICATIONS

Japanese Office Action with English translation dated Apr. 2, 2019, 8 pages.

*Primary Examiner* — Tony H Winner
(74) *Attorney, Agent, or Firm* — Rankin, Hill & Clark LLP (57) ABSTRACT

A canister structure for a saddle riding vehicle, including a canister connected with a fuel tank using a connection line, the canister adsorbing fuel vapor generated in the fuel tank, and a purge valve disposed in a path through which the fuel vapor is returned from the canister to an air intake system of an engine, includes an annular canister rubber that fits over an outer cylinder of the canister; a canister stay disposed on a vehicle body side; and an engagement portion disposed on the purge valve. In the canister structure, the canister rubber has, formed on an outer periphery thereof, an anterior-side mounting portion and a posterior-side mounting portion each having an insertion hole in which the canister stay is inserted and a purge valve mounting portion having an engagement portion insertion hole in which the engagement portion of the purge valve is inserted.

7 Claims, 9 Drawing Sheets

(51) Int. Cl.
  *B62J 35/00* (2006.01)
  *B62J 37/00* (2006.01)
  *F02M 25/08* (2006.01)
  *B60K 15/03* (2006.01)
  *B62M 7/00* (2010.01)
  *B62K 11/00* (2006.01)

(52) U.S. Cl.
  CPC ... *F02M 25/0854* (2013.01); *B60K 15/03006* (2013.01); *B60Y 2200/12* (2013.01); *B62K 11/00* (2013.01); *B62M 7/00* (2013.01)

(56) References Cited

U.S. PATENT DOCUMENTS

2011/0073399 A1* 3/2011 Seki .................. B62J 37/00
  180/219
2012/0247862 A1* 10/2012 Nishimura ............ B62K 11/04
  180/299

FOREIGN PATENT DOCUMENTS

JP  2016-8014 A  1/2016
WO 2016/156893 A1 10/2016

\* cited by examiner

CANISTER STRUCTURE FOR SADDLE RIDING VEHICLE

INCORPORATION BY REFERENCE

The present application claims priority under 35 U.S.C. § 119 to Japanese Patent Application No. 2017-166008 filed on Aug. 30, 2017. The content of the application is incorporated herein by reference in its entirety.

TECHNICAL FIELD

The present invention relates to a canister structure for a saddle riding vehicle.

BACKGROUND ART

In a known canister structure for a saddle riding vehicle, a canister is supported via an elastic member by a stay that is fixed to a vehicle body frame and a purge valve is fixed by a bolt to an arm that extends from the stay (see, for example, Patent Document 1).

PRIOR ART DOCUMENT

Patent Document

[Patent Document 1]
Japanese Patent Laid-Open No. 2012-206530

SUMMARY OF THE INVENTION

Problem to be Solved by the Invention

In the known canister structure for a saddle riding vehicle described above, no consideration is given to vibration isolation for the purge valve, though the elastic member does reduce vibration of the canister. In addition, because of the arm that is provided for exclusively supporting the purge valve, the purge valve supporting structure is complicated.

The present invention has been made in view of the foregoing situation and it is an object of the present invention to enable a canister structure for a saddle riding vehicle to reduce vibration of a purge valve and to support the purge valve using a simple structure.

Means for Solving the Problem

A canister structure for a saddle riding vehicle according to an aspect of the present invention is provided that includes a canister (61) connected with a fuel tank (42) using a connection line (62), the canister (61) adsorbing fuel vapor generated in the fuel tank (42), and a purge valve (64) disposed in a path through which the fuel vapor is returned from the canister (61) to an air intake system (40) of an engine (10). In accordance with the aspect of the present invention, the canister structure for a saddle riding vehicle includes: an annular canister rubber (70) that fits over an outer cylinder (74) of the canister (61); a canister stay (69) disposed on a vehicle body side; and an engagement portion (85) disposed on the purge valve (64). In the canister structure, the canister rubber (70) has, formed on an outer periphery thereof, a vehicle body-side mounting portion (91) having an insertion hole (92a, 93a) in which the canister stay (69) is inserted and a purge valve mounting portion (94) having an engagement portion insertion hole (94a) in which the engagement portion (85) of the purge valve (64) is inserted.

In the aspect of the present invention, preferably, the purge valve mounting portion (94) is disposed on an upper portion of the canister rubber (70) and the vehicle body-side mounting portion (91) is disposed on a lower portion of the canister rubber (70). Preferably, the canister stay (69) includes an anterior-side stay portion (71) that extends vertically at a position anterior to the canister (61) and a posterior-side stay portion (72) that extends vertically at a position posterior to the canister (61). Preferably, the vehicle body-side mounting portion (91) includes an anterior-side mounting portion (92) in which the anterior-side stay portion (71) is inserted and a posterior-side mounting portion (93) in which the posterior-side stay portion (72) is inserted.

In the aspect of the present invention, further preferably, the anterior-side stay portion (71) extends from an inferior portion of the canister (61) obliquely upwardly toward a front and the posterior-side stay portion (72) extends from an inferior portion of the canister (61) obliquely upwardly toward a rear.

In the aspect of the present invention, preferably, the purge valve (64) is disposed on an upper portion of the canister (61) via the canister rubber (70), and the canister (61) is connected with the purge valve (64) by a purge line (63).

In the aspect of the present invention, preferably, the canister structure further includes a guard (86) disposed on an opening formed by an annular portion (90) of the canister rubber (70). Preferably, the guard (86) covers the canister (61) and has a mounting tab (88, 89). Preferably, the canister rubber (70) further includes, formed on the outer periphery thereof, a guard mounting portion (95, 96) that has a mounting tab insertion hole (95a, 96a) in which the mounting tab (88, 89) of the guard (86) is inserted.

In the aspect of the present invention, preferably, at least either one of the vehicle body-side mounting portion (91) and the purge valve mounting portion (94) protrudes from the outer periphery of the canister rubber (70) outwardly in a radial direction.

In the aspect of the present invention, further preferably, the anterior-side stay portion (71) and the posterior-side stay portion (72) are formed separately from each other.

Effects of the Invention

In the canister structure for a saddle riding vehicle according to the aspect of the present invention, the canister structure includes the canister connected with the fuel tank using the connection line, the canister adsorbing the fuel vapor generated in the fuel tank, and the purge valve disposed in the path through which the fuel vapor is returned from the canister to an air intake system of the engine. The canister structure includes: the annular canister rubber that fits over the outer cylinder of the canister; the canister stay disposed on the vehicle body side; and the engagement portion disposed on the purge valve. The canister rubber has, formed on the outer periphery thereof, the vehicle body-side mounting portion having the insertion holes in which the canister stay is inserted and the purge valve mounting portion having the engagement portion insertion hole in which the engagement portion of the purge valve is inserted.

In the foregoing arrangements, the engagement portion of the purge valve is inserted in the purge valve mounting portion of the canister rubber that is used for mounting the canister on the vehicle body side. Thus, vibration to be transmitted to the purge valve can be reduced by the canister rubber formed of rubber. Furthermore, the canister rubber can be used for mounting the purge valve. This feature eliminates the need for a support member dedicated to the purge valve, so that the purge valve can be supported by a simple structure.

In the aspect of the present invention, preferably, the purge valve mounting portion is disposed on the upper portion of the canister rubber and the vehicle body-side mounting portion is disposed on the lower portion of the canister rubber. Preferably, the canister stay includes the anterior-side stay portion that extends vertically at a position anterior to the canister and the posterior-side stay portion that extends vertically at a position posterior to the canister. Preferably, the vehicle body-side mounting portion includes the anterior-side mounting portion in which the anterior-side stay portion is inserted and the posterior-side mounting portion in which the posterior-side stay portion is inserted.

Through the foregoing arrangements, the anterior-side stay portion inserted in the anterior-side mounting portion of the canister rubber and the posterior-side stay portion inserted in the posterior-side mounting portion of the canister rubber sandwich the canister in the fore-aft direction, so that the canister can be rigidly supported. Additionally, the purge valve can be supported through the use of a space superior to the canister rubber.

In the aspect of the present invention, preferably, the anterior-side stay portion extends from an inferior portion of the canister obliquely upwardly toward the front and the posterior-side stay portion extends from an inferior portion of the canister obliquely upwardly toward the rear.

The foregoing arrangement allows the anterior-side stay portion that extends from the inferior portion of the canister obliquely upwardly toward the front and the posterior-side stay portion that extends from the inferior portion of the canister obliquely upwardly toward the rear to sandwich the canister in the fore-aft direction and to support the canister from below, so that the canister can be supported rigidly. Furthermore, a direction in which the anterior-side stay portion is inserted in the canister rubber differs from a direction in which the posterior-side stay portion is inserted in the canister rubber. This arrangement can prevent the anterior-side stay portion and the posterior-side stay portion from being removed from the canister rubber.

In the aspect of the present invention, preferably, the purge valve is mounted on the upper portion of the canister via the canister rubber and the canister is connected with the purge valve by the purge line.

The foregoing arrangement results in the canister and the purge valve connected together by the purge line being supported by the canister rubber formed of rubber. Thus, the vibration to be transmitted from the vehicle body side to the purge line via the canister and the purge valve is transmitted via the canister rubber, so that vibration of the purge line can be effectively prevented and load on the purge line can be reduced.

In the aspect of the present invention, preferably, the canister structure further includes the guard disposed on the opening formed by the annular portion of the canister rubber. Preferably, the guard covers the canister and has the mounting tabs. Preferably, the canister rubber further includes, formed on the outer periphery thereof, the guard mounting portions that have the mounting tab insertion holes in which the mounting tabs of the guard are inserted.

The foregoing arrangements allow the guard to be mounted by the mounting tabs being inserted in the guard mounting portions of the canister rubber, so that the guard can be provided through a simple structure.

In the aspect of the present invention, preferably, at least either one of the vehicle body-side mounting portion and the purge valve mounting portion protrudes from the outer periphery of the canister rubber outwardly in the radial direction.

Because the vehicle body-side mounting portion and the purge valve mounting portion protrude outwardly in the radial direction, spaces for providing the insertion holes and the engagement portion insertion hole can readily be obtained.

In the aspect of the present invention, further preferably, the anterior-side stay portion and the posterior-side stay portion are formed separately from each other.

Thus, even in a configuration in which the direction in which the anterior-side stay portion is inserted in the canister rubber differs from the direction in which the posterior-side stay portion is inserted in the canister rubber, the anterior-side stay portion and the posterior-side stay portion can be individually inserted in the canister rubber and the canister rubber can be easily assembled with the canister stay. Additionally, the canister stay is divided into the anterior-side stay portion and the posterior-side stay portion for simpler configuration and the canister stay can be manufactured easily.

MODE FOR CARRYING OUT THE INVENTION

A specific embodiment to which the present invention is applied will be described below with reference to the accompanying drawings. Throughout the descriptions given hereunder, longitudinal, lateral, and vertical directions are relative to the vehicle body unless otherwise specified. In the drawings, an arrow FR denotes a vehicle body forward direction, an arrow UP denotes a vehicle body upward direction, and an arrow LH denotes a vehicle body leftward direction.

Figure 1:
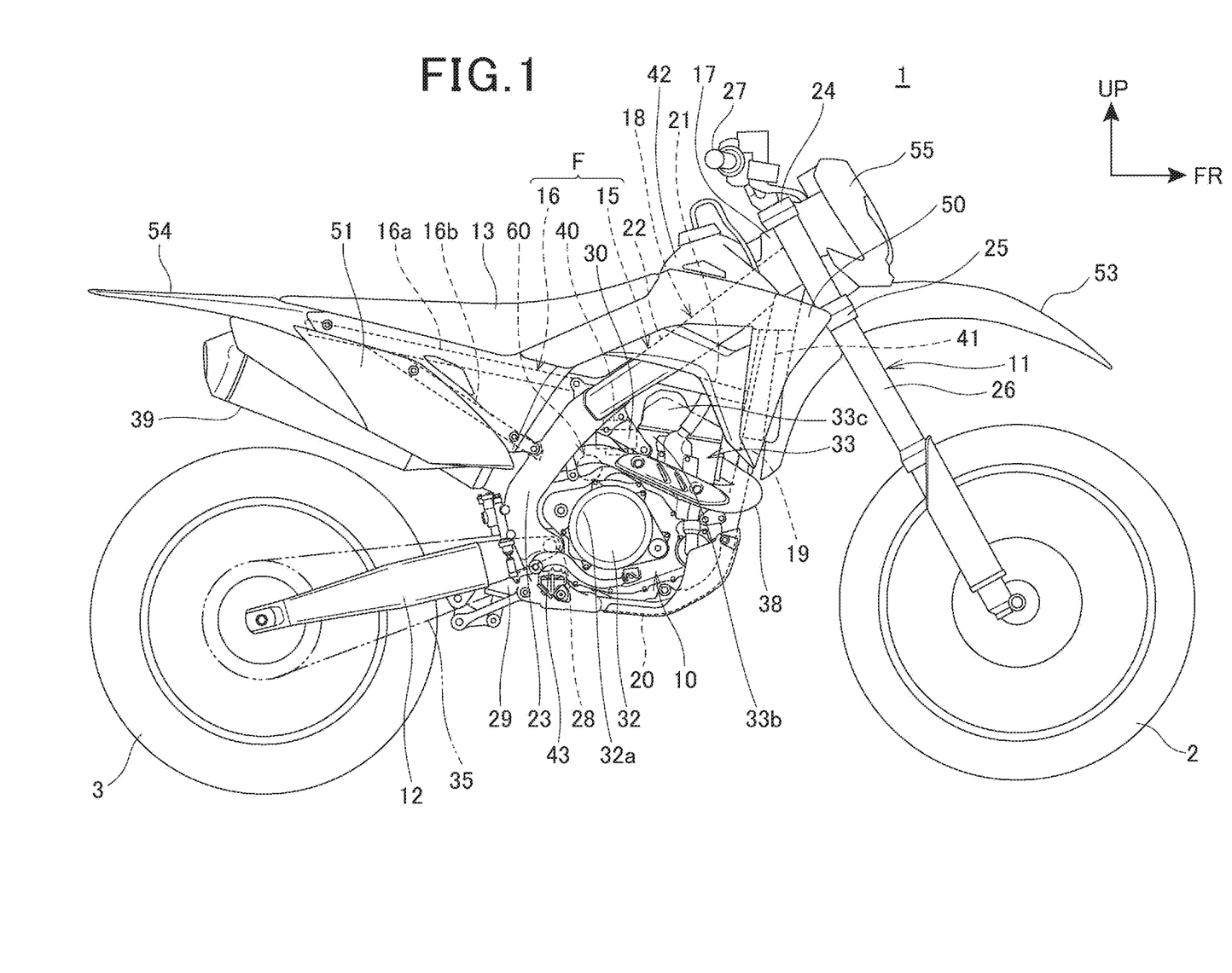
FIG. 1 is a right side elevational view of a motorcycle according to an embodiment of the present invention.

FIG. 1 is a right side elevational view of a motorcycle 1 according to an embodiment of the present invention. It is noted that, when a part is provided in pairs, FIG. 1 depicts only the part on the right-hand side, including a reference symbol assigned thereto.

The motorcycle 1 includes a vehicle body frame F, a front fork 11, and a rear fork 12. The vehicle body frame F supports an engine 10 as a power unit. The front fork 11 steerably supports a front wheel 2. The front fork 11 is steerably supported at a front end of the vehicle body frame F. The rear fork 12 supports a rear wheel 3. The rear fork 12 is disposed on a rear portion side of the vehicle body frame F. The motorcycle 1 is a saddle riding vehicle including a seat 13, which a rider straddles, disposed superior to a rear portion of the vehicle body frame F.

The vehicle body frame F includes a front frame 15 and a rear frame 16. The front frame 15 supports the engine 10 as an internal combustion engine. The rear frame 16 extends toward the rear from the front frame 15.

The front frame 15 includes a head pipe 17, a pair of left and right main frames 18, 18, a down frame 19, a pair of left and right lower frames 20, 20, and a reinforcement frame 21. The head pipe 17 is disposed at a front end of the front frame 15.

Specifically, the main frames 18, 18 integrally include a pair of left and right main tubes 22, 22 and a pair of left and right pivot frames 23, 23. The main tubes 22, 22 extend from a rear surface of the head pipe 17 downwardly toward the rear. The pivot frames 23, 23 extend from rear ends of the main tubes 22, 22 downwardly toward the rear. The main frames 18, 18 extend downwardly toward the rear while widening a spacing therebetween in a vehicle width direction at front end portions thereof and extend downwardly toward the rear substantially in parallel with each other at rear portions thereof.

The down frame 19 has an upper end portion connected with a position inferior to the main frames 18, 18 at a rear portion of the head pipe 17 and the front end portions of the main frames 18, 18. The down frame 19 extends downwardly toward the rear at an inclination sharper than the main frames 18, 18 are inclined. The down frame 19 assumes a single frame extending along a center in the vehicle width direction.

The pivot frames 23, 23 extend from rear ends of the main tubes 22, 22 downwardly toward the rear at a greater inclination than the main tubes 22, 22.

The lower frames 20, 20 branch laterally from a lower end portion of the down frame 19 to extend downwardly and thereafter bend to extend rearwardly before being connected with lower end portions of the pivot frames 23, 23.

The reinforcement frame 21 connects between the down frame 19 and the main tubes 22, 22.

The rear frame 16 includes a pair of left and right seat frames 16a, 16a and a pair of left and right sub-frames 16b, 16b. The seat frames 16a, 16a extend from rear end portions of the main frames 18, 18 toward the rear. The sub-frames 16b, 16b connect between the pivot frames 23, 23 and rear portions of the seat frames 16a, 16a.

The front fork 11 includes a steering shaft (not depicted), a top bridge 24, a bottom bridge 25, and fork tubes 26, 26. The steering shaft is journaled on the head pipe 17. The top bridge 24 is fixed to an upper end of the steering shaft. The bottom bridge 25 is fixed to a lower end of the steering shaft. The fork tubes 26, 26 are disposed laterally across the head pipe 17 and supported by the top bridge 24 and the bottom bridge 25.

The front wheel 2 is journaled on lower end portions of the fork tubes 26, 26. A handlebar 27 used by the rider to steer the front wheel 2 is mounted on the top bridge 24.

The rear fork 12 is formed into an arm extending toward the rear. The rear fork 12 has a front end portion journaled on a pivot shaft 28. The pivot shaft 28 connects rear end portions of the left and right pivot frames 23, 23 in the vehicle width direction. The rear fork 12 allows the pivot shaft 28 to oscillate vertically. The rear wheel 3 is journaled on a rear end portion of the rear fork 12.

A rear suspension 29 is disposed across a front portion of the rear fork 12 and the front frame 15.

The engine 10 is disposed inside the front frame 15, formed into a frame shape in a side view, and supported by the front frame 15. An engine hanger 30, which extends downwardly toward the front, is fixed to vertically intermediate portions of the main frames 18, 18.

The engine 10 includes a crankcase 32 and a cylinder portion 33. The crankcase 32 supports a crankshaft that extends in the vehicle width direction. The cylinder portion 33 extends from a front portion of the crankcase 32 upwardly.

The cylinder portion 33 includes a cylinder 33a (see FIG. 3), a cylinder head 33b, and a cylinder head cover 33c. The cylinder 33a is connected with an upper portion of a front portion of the crankcase 32. The cylinder head 33b is connected with an upper surface of the cylinder 33a.

A transmission (not depicted) is housed inside a rear portion 32a of the crankcase 32. The engine 10 is water-cooled.

The engine hanger 30 has a front end portion connected with a rear portion of the cylinder head 33b.

An output from the engine 10 is transmitted to the rear wheel 3 by a chain 35 that is wound across an output shaft 34 (see FIG. 3) of the transmission of the engine 10 and the rear wheel 3.

An exhaust pipe 38 of the engine 10 extends from an exhaust port in a front surface of the cylinder head 33b toward the front. The exhaust pipe 38 further extends toward a first side (right-hand side) in the vehicle width direction and bends toward the rear. The exhaust pipe 38 then passes along a path superior to the crankcase 32 and on the right-hand side of the cylinder portion 33 and extends toward the rear. The exhaust pipe 38 has a rear end portion connected with a muffler 39 disposed at a position superior to the rear wheel 3.

An air intake system (air intake apparatus) of the engine 10 includes an air cleaner box (not depicted) and a throttle body 40. Outside air is drawn into the air cleaner box. The throttle body 40 is connected with an intake port in a rear surface of the cylinder head 33b. Air drawn in through the air cleaner box undergoes an adjustment of a flow rate by the throttle body 40 before being supplied to the engine 10. A fuel supply apparatus (not depicted) injects fuel into an air intake passage of the air intake system.

The motorcycle 1 includes a pair of left and right radiators 41, 41. The plate-shaped radiators 41, 41 dissipate heat from coolant of the engine 10. The radiators 41, 41 are disposed on left and right lateral sides of the down frame 19 disposed anterior to the cylinder portion 33.

A fuel tank 42 is disposed between the head pipe 17 and the seat 13, and between the left and right main frames 18, 18. The fuel tank 42 is supported on the main frames 18, 18. The fuel tank 42 has an upper portion bulging superiorly from upper surfaces of the main frames 18, 18.

The seat 13 extends from a rear portion of the fuel tank 42 toward the rear along upper surfaces of the seat frames 16a, 16a. The seat 13 is supported by the fuel tank 42 and the seat frames 16a, 16a from below.

A pair of left and right steps 43, 43 is disposed at lower end portions of the pivot frames 23, 23. The rider can rest his or her feet on the steps 43, 43.

The motorcycle 1 includes a vehicle body cover. The vehicle body cover covers the vehicle body that includes the vehicle body frame F and the engine 10. The vehicle body cover includes a pair of left and right radiator shrouds 50, 50 and a pair of left and right side covers 51, 51.

The radiator shrouds 50, 50 are plate-shaped covers that cover the radiators 41, 41, the upper portion of the down frame 19, the main tubes 22, 22, and the fuel tank 42 from outer lateral sides. The radiator shrouds 50, 50 are fixed by fasteners with respect to the radiators 41, 41, the main tubes 22, 22, and the fuel tank 42.

The side covers 51, 51 cover the rear frame 16 and the muffler 39 from the outer lateral sides.

The motorcycle 1 further includes a front fender 53, a rear fender 54, and a front cover 55. The front fender 53 is mounted on the front fork 11 and covers the front wheel 2 from above. The rear fender 54 covers the rear wheel 3 from above. The front cover 55 covers upper portions of the fork tubes 26, 26 from the front.

The motorcycle 1 includes a fuel vapor treatment apparatus 60. The fuel vapor treatment apparatus 60 temporarily stores fuel vapor generated in the fuel tank 42. The fuel vapor treatment apparatus 60 then supplies the fuel vapor to the air intake system of the engine 10 to allow the fuel vapor to be burned in the engine 10. The fuel vapor treatment apparatus 60 prevents the fuel vapor generated in the fuel tank 42 from diffusing to the outside.

Figure 2:
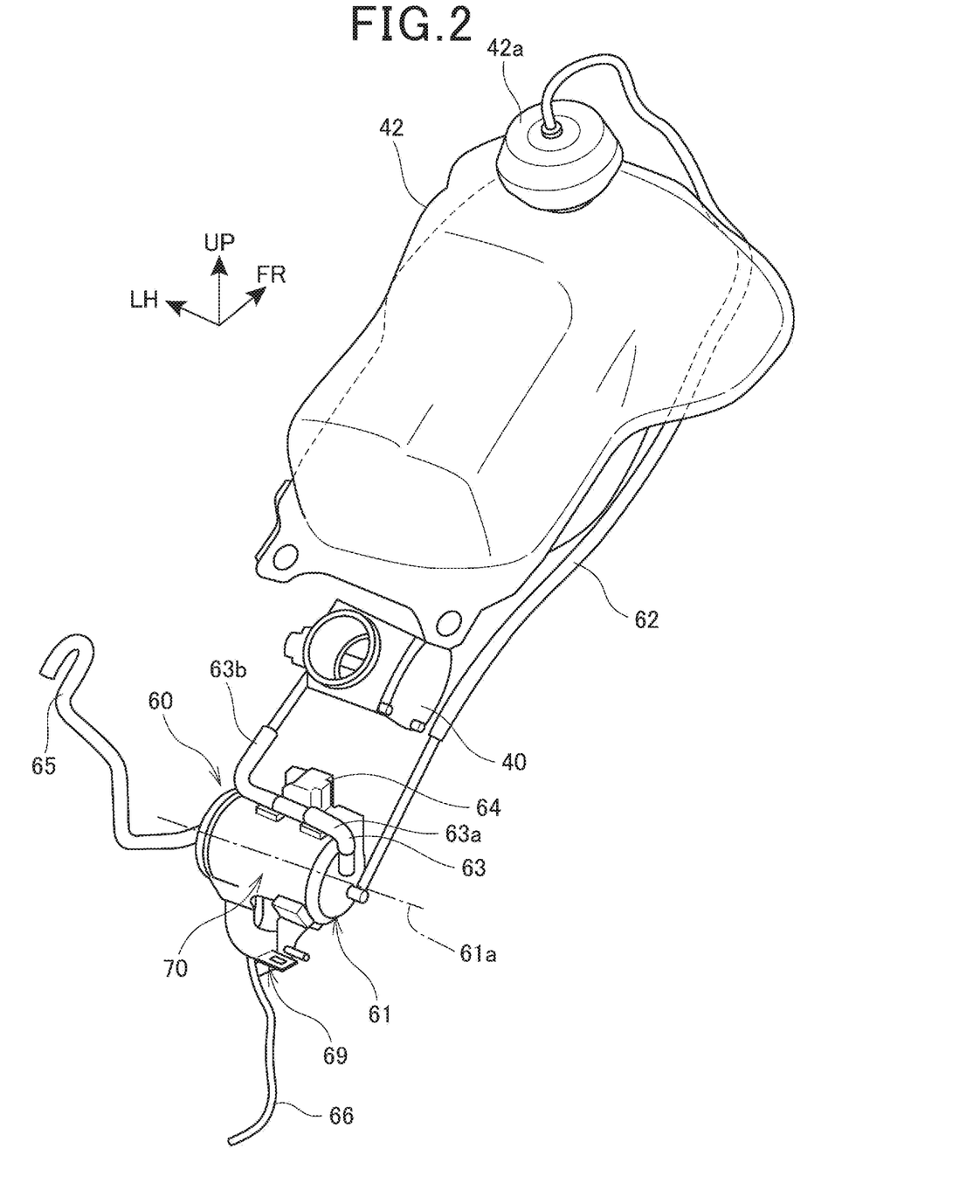
FIG. 2 is a perspective view of a configuration of a fuel vapor treatment apparatus.

FIG. 2 is a perspective view of a configuration of the fuel vapor treatment apparatus 60.

The fuel vapor treatment apparatus 60 includes a canister 61, a charge line 62 (connection line), a purge line 63, and a purge valve 64. The canister 61 stores fuel vapor. The charge line 62 connects the canister 61 with the fuel tank 42. The purge line 63 connects the canister 61 with the throttle body 40 of the air intake system. The purge valve 64 is disposed midway in the purge line 63.

The fuel vapor treatment apparatus 60 further includes an outside air introduction line 65 and a drain line 66. The outside air introduction line 65 provides communication between the canister 61 and the outside. The drain line 66 discharges water or liquefied fuel from the canister 61.

The charge line 62 extends from a tank cap 42a of the fuel tank 42 downwardly and is connected with the canister 61.

An adsorbent 67 (FIG. 5) such as activated carbon is housed inside the canister 61.

The purge line 63 extends from the canister 61 upwardly and is connected with the throttle body 40.

The purge valve 64 opens or closes a flow passage of the purge line 63. The purge valve 64 is disposed in a path through which fuel vapor is returned from the canister 61 to the throttle body 40. The purge valve 64 regulates the flow rate of the fuel vapor flowing from the canister 61 to the throttle body 40. The purge valve 64 is electrically opened or closed by a controller in the motorcycle 1 depending on an operating state of the engine 10. The purge valve 64 is, for example, a solenoid valve.

Fuel that vaporizes in the fuel tank 42 passes through the charge line 62 to flow into the canister 61 and is temporarily adsorbed by the adsorbent 67 (FIG. 5) inside the canister 61. When the purge valve 64 is opened, the canister 61 communicates with the throttle body 40. Then, intake vacuum of the throttle body 40 causes the fuel vapor in the canister 61 to flow through the purge line 63 and the throttle body 40 into the engine 10 and to be burned in the engine 10. In addition, the vacuum in the canister 61 causes outside air to be introduced via the outside air introduction line 65 into the canister 61. The outside air causes the adsorbed fuel vapor to be removed from the adsorbent 67.

Figure 3:
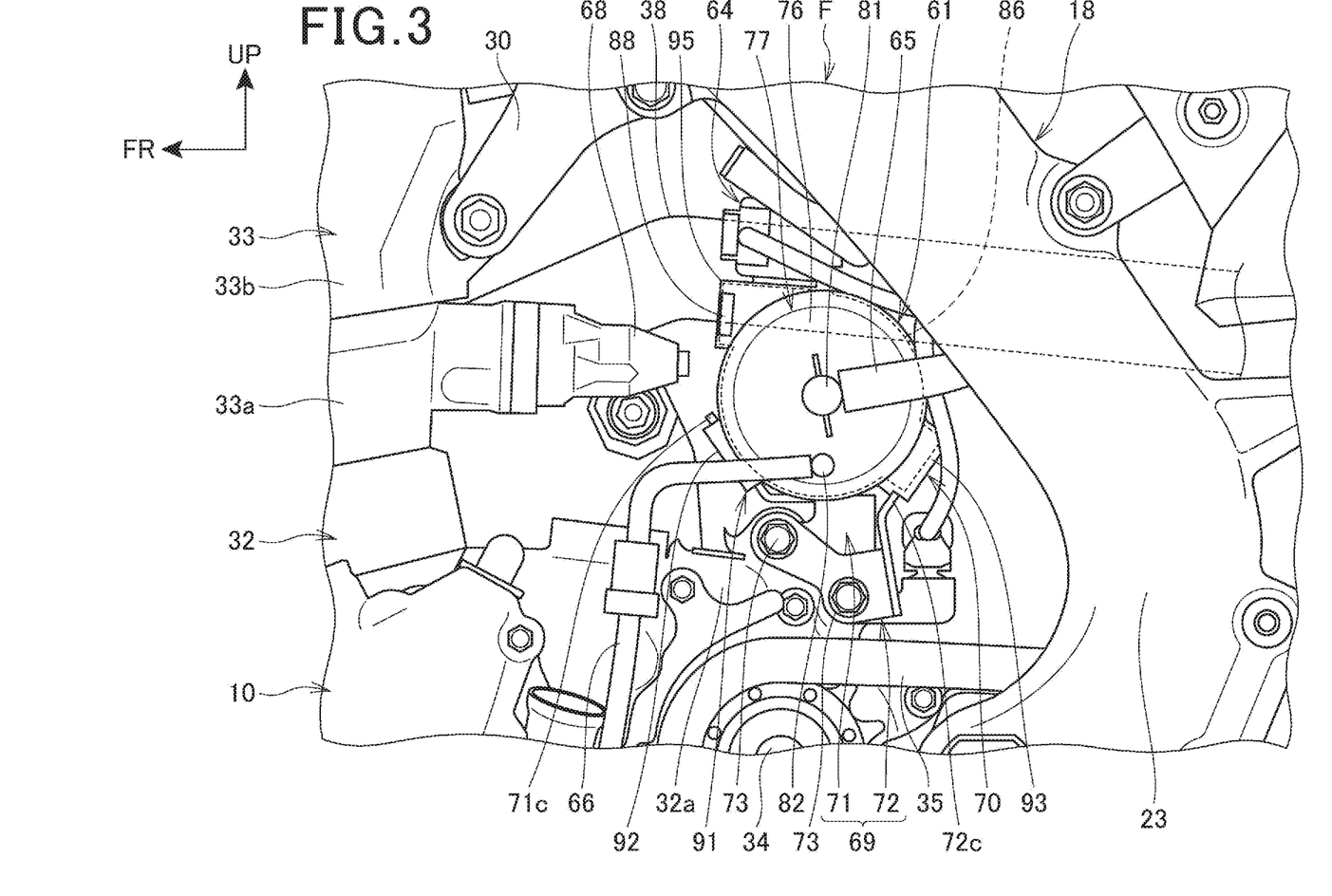
FIG. 3 is a left side elevational view of a structure of parts around a canister.

FIG. 3 is a left side elevational view of a structure of parts around the canister 61.

A cam chain tension adjustment mechanism 68 is disposed on a rear surface of the cylinder 33a of the engine 10.

A cam chain (not depicted) that drives a valve actuating mechanism of the cylinder head 33b is disposed inside the cylinder 33a so as to extend vertically. The cam chain tension adjustment mechanism 68 abuts on the cam chain from the rear and adjusts tension in the cam chain.

The cam chain tension adjustment mechanism 68 extends from a rear surface of the cylinder head 33b substantially horizontally toward the rear and is disposed inferior to the engine hanger 30 and superior to the rear portion 32a of the crankcase 32.

The canister 61 is a cylindrical container. The canister 61 is disposed such that an axis 61a (FIG. 2) of the cylinder is oriented toward the vehicle width direction.

The canister 61 is disposed between the cam chain tension adjustment mechanism 68 and the pivot frames 23, 23 in a vehicle fore-aft direction and between the pivot frames 23, 23 and the rear portion 32a of the crankcase 32 in a vertical direction.

Figure 4:
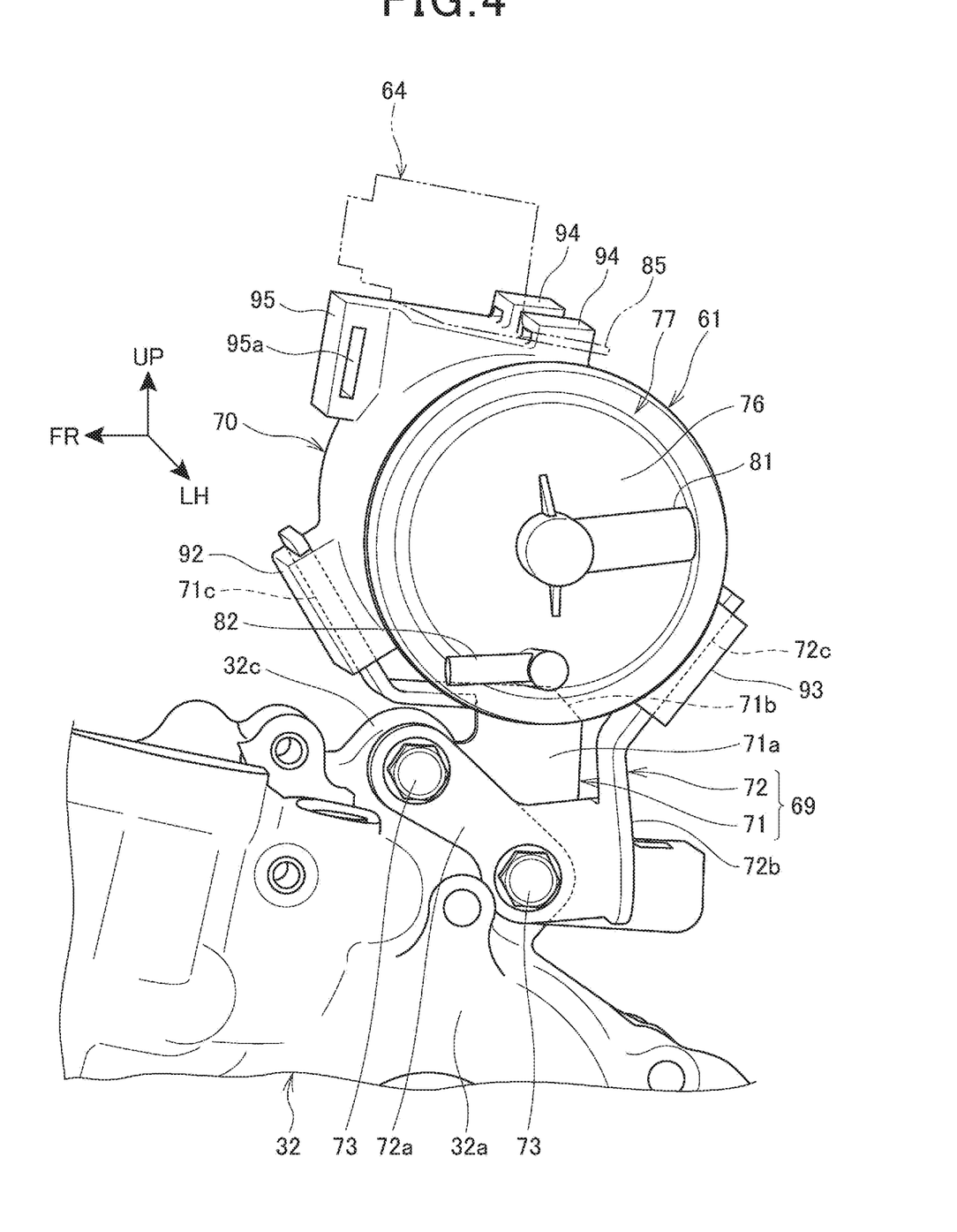
FIG. 4 is a view depicting a condition of the canister mounted in the vehicle, as viewed from a left lateral side.

FIG. 4 is a view depicting a condition of the canister 61 mounted in the vehicle, as viewed from a left lateral side. It is noted that FIG. 4 omits depicting a guard 86 to be described later.

Reference is made to FIGS. 2 to 4. The canister 61 is mounted on the vehicle body via a canister stay 69 and a canister rubber 70. The canister stay 69 is disposed on an upper surface of the rear portion 32a of the crankcase 32. The canister rubber 70 fits over an outer periphery of the canister 61.

The canister stay 69 includes an anterior-side stay portion 71 and a posterior-side stay portion 72. The anterior-side stay portion 71 supports the canister 61 from an anterior side. The posterior-side stay portion 72 supports the canister 61 from a posterior side. The anterior-side stay portion 71 and the posterior-side stay portion 72 are formed separately from each other. The anterior-side stay portion 71 and the posterior-side stay portion 72 are formed of, for example, metal stock that is subjected to bending and blanking in pressworking operations.

Specifically, the anterior-side stay portion 71 includes a fixing plate 71a, an upper plate 71b, and an anterior-side insert 71c. The fixing plate 71a is disposed such that a wall thickness direction thereof is oriented toward the vehicle width direction. The upper plate 71b extends from an upper end of the fixing plate 71a toward the inside in the vehicle width direction. The anterior-side insert 71c extends from a front end of the upper plate 71b obliquely upwardly toward the front.

The posterior-side stay portion 72 includes a fixing plate 72a, a vertical plate 72b, and a posterior-side insert 72c. The fixing plate 72a is disposed such that a wall thickness direction thereof is oriented toward the vehicle width direction. The vertical plate 72b extends from a rear end of the fixing plate 72a toward the outside in the vehicle width direction. The posterior-side insert 72c extends from an upper end of the vertical plate 72b obliquely upwardly toward the rear.

The anterior-side stay portion 71 and the posterior-side stay portion 72 are fixed to a vehicle body-side fixing portion 32c by stay fixing bolts 73, 73. The vehicle body-side fixing portion 32c protrudes superiorly from the upper surface of the rear portion 32a of the crankcase 32. The stay fixing bolts 73, 73 are inserted from the outside in the vehicle width direction.

Specifically, the fixing plate 71a and the fixing plate 72a are placed one on top of the other on the outer lateral surface of the vehicle body-side fixing portion 32c and the stay fixing bolts 73, 73 are passed through the fixing plate 71a and the fixing plate 72a to thereby be fastened to the vehicle body-side fixing portion 32c. The fixing plate 71a is sandwiched between the fixing plate 72a and the vehicle body-side fixing portion 32c. Specifically, the anterior-side stay portion 71 and the posterior-side stay portion 72 are jointly fastened to the vehicle body-side fixing portion 32c on the vehicle body side by the stay fixing bolts 73, 73.

Figure 5:
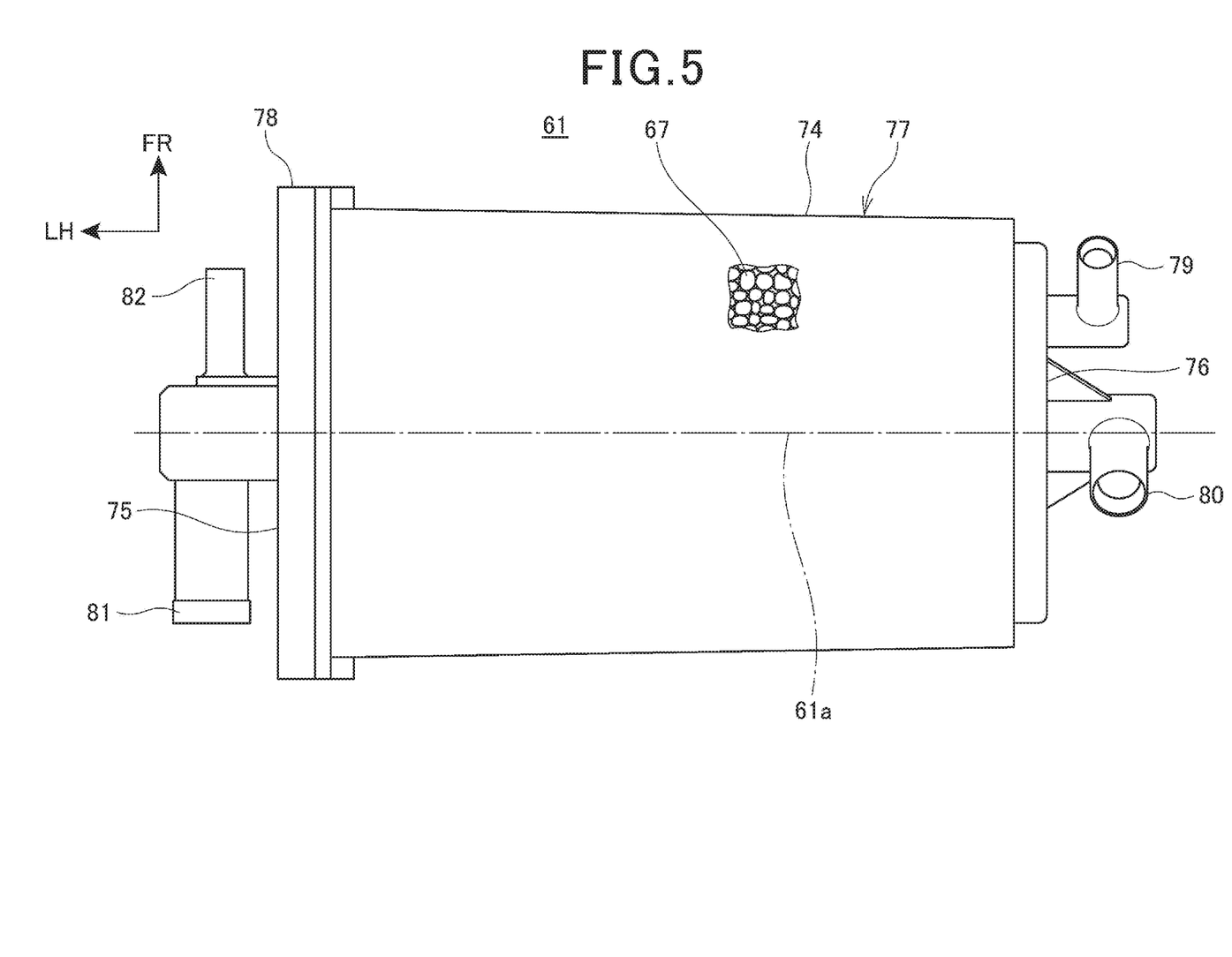
FIG. 5 is a plan view of the canister as viewed from above.
Figure 6:
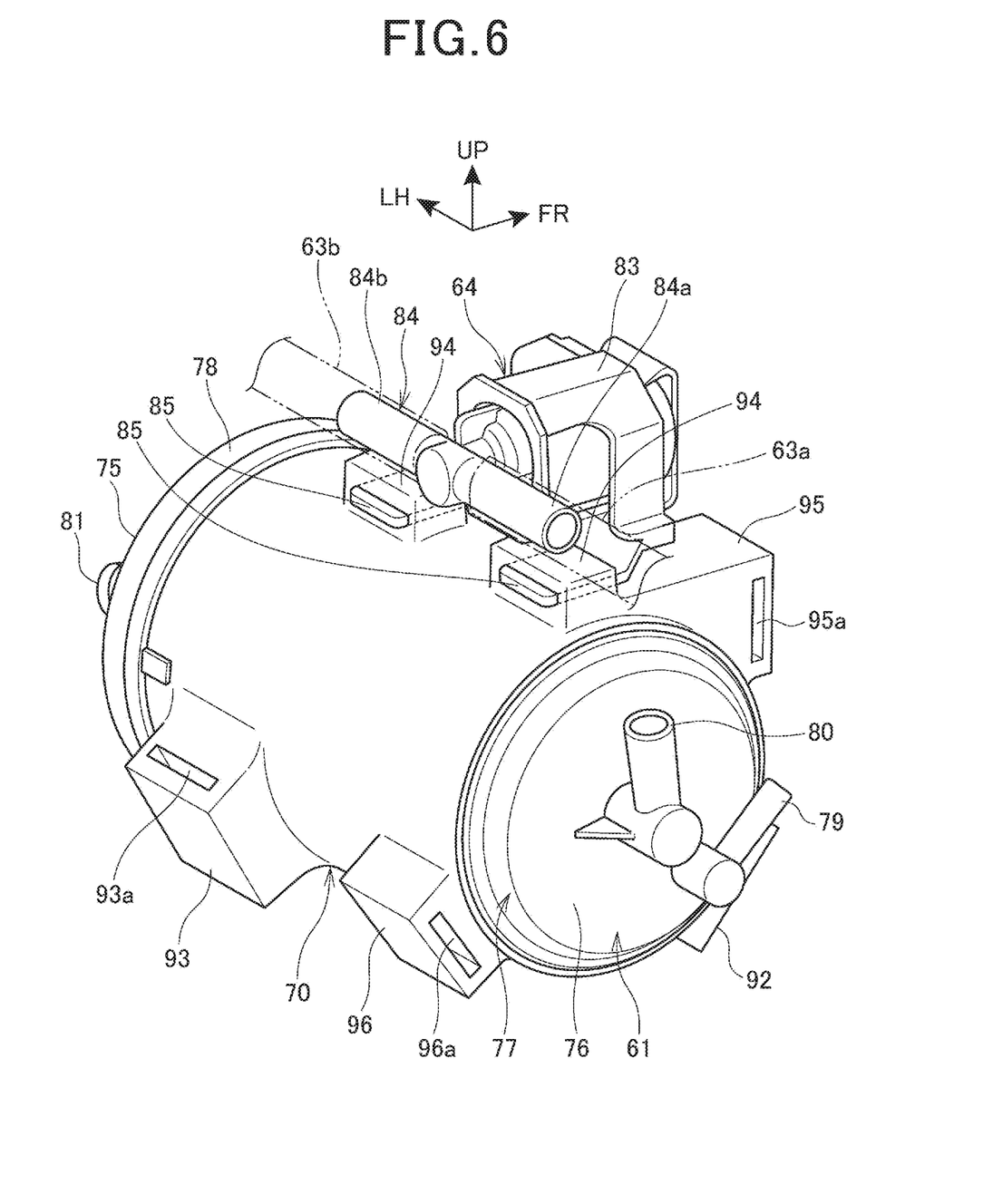
FIG. 6 is a perspective view of the canister, a canister rubber, and other parts, as viewed from a rear right side.

FIG. 5 is a plan view of the canister 61 as viewed from above. FIG. 6 is a perspective view of the canister 61, the canister rubber 70, and other parts, as viewed from a rear right side.

Reference is made to FIGS. 3 to 6. The canister 61 includes an outer cylinder 74, a first-side lateral surface portion 75, and a second-side lateral surface portion 76. The outer cylinder 74 has a cylindrical shape. The first-side lateral surface portion 75 closes a first end (left end) in an axial direction of the outer cylinder 74. The second-side lateral surface portion 76 closes a second end (right end) in the axial direction of the outer cylinder 74. It is here noted that the axial direction of the outer cylinder 74 extends along the axis 61a.

The outer cylinder 74 and the second-side lateral surface portion 76 are integrally formed as a case 77 having a closed-bottom cylindrical shape. The first-side lateral surface portion 75 is formed of a disc-shaped cap 78. The cap 78 closes an opening on the first end of the outer cylinder 74.

The adsorbent 67 is housed inside the case 77.

A charge line connector 79 and a purge line connector 80 are disposed on an outer surface of the second-side lateral surface portion 76 of the case 77. The charge line 62 has a downstream end connected with the charge line connector 79. The purge line 63 has an upstream end connected with the purge line connector 80. In a side view, the charge line connector 79 extends obliquely upwardly toward the front and the purge line connector 80 extends upwardly. The charge line connector 79 is disposed inferior to the purge line connector 80.

An outside air introduction line connector 81 and a drain line connector 82 are disposed on an outer surface of the cap 78. The outside air introduction line 65 has a downstream end connected with the outside air introduction line connector 81. The drain line 66 has an upstream end connected with the drain line connector 82.

In a side view, the outside air introduction line connector 81 extends posteriorly and the drain line connector 82 extends anteriorly. The drain line connector 82 is disposed at a lower portion of the cap 78 and inferior to the outside air introduction line connector 81.

As depicted in FIG. 6, the purge valve 64 is mounted on an upper surface of the canister rubber 70.

The purge valve 64 includes a valve main unit 83, a line connector 84, and a plurality of engagement portions 85, 85. The valve main unit 83 includes, for example, a valve drive. The line connector 84 extends from a rear portion of the valve main unit 83 in the vehicle width direction. The engagement portions 85, 85 extend posteriorly from a lower portion of the valve main unit 83. The engagement portions 85, 85 are disposed in juxtaposition with each other in a lateral direction. The purge valve 64 is mounted on the canister rubber 70 via the engagement portions 85, 85. The line connector 84 extends in a direction substantially orthogonal to directions in which the engagement portions 85, 85 extend.

The purge line 63 is divided into an upstream part 63a and a downstream part 63b. The upstream part 63a has a downstream end connected with a first end 84a of the line connector 84. The downstream part 63b has an upstream end connected with a second end 84b of the line connector 84.

Figure 7:
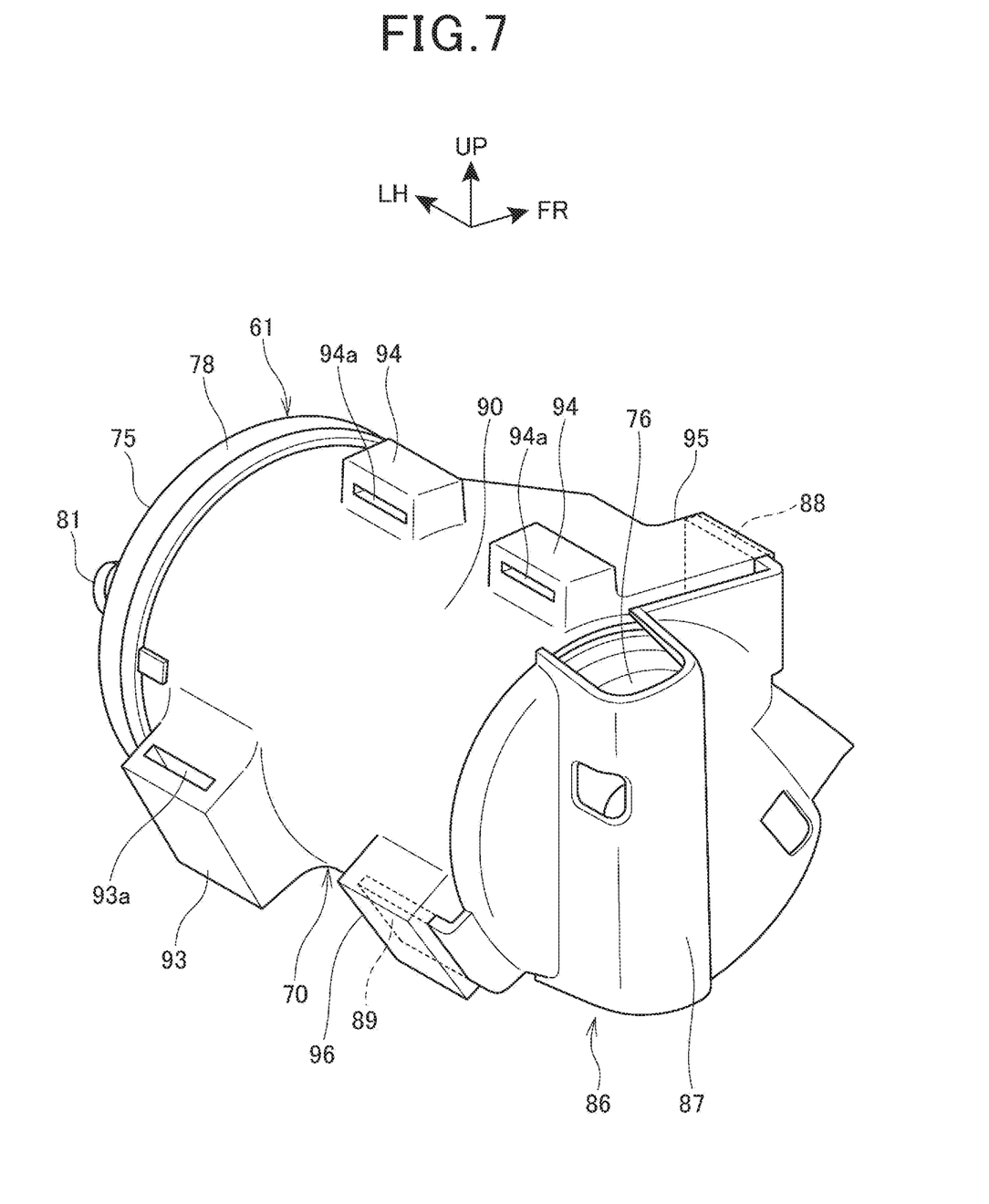
FIG. 7 is a perspective view of the parts depicted in FIG. 6, on which a guard is mounted.

FIG. 7 is a perspective view of the parts depicted in FIG. 6, on which the guard 86 is mounted. It is noted that FIG. 7 omits depicting the purge valve 64.

The second-side lateral surface portion 76 of the canister 61 is covered laterally by the guard 86.

The guard 86 includes a substantially disc-shaped cover 87 and has an anterior-side mounting tab 88 (mounting tab) and a posterior-side mounting tab 89 (mounting tab). The anterior-side mounting tab 88 and the posterior-side mounting tab 89 extend from peripheral edges of the cover 87 in the axial direction of the canister 61.

The anterior-side mounting tab 88 is disposed on an upper portion of a front portion of the cover 87. The posterior-side mounting tab 89 is disposed on a lower portion of a rear portion of the cover 87. The guard 86 is mounted on the canister rubber 70 via the anterior-side mounting tab 88 and the posterior-side mounting tab 89. The guard 86 covers the charge line connector 79 (FIG. 6) and the purge line connector 80 (FIG. 6).

Figure 8:
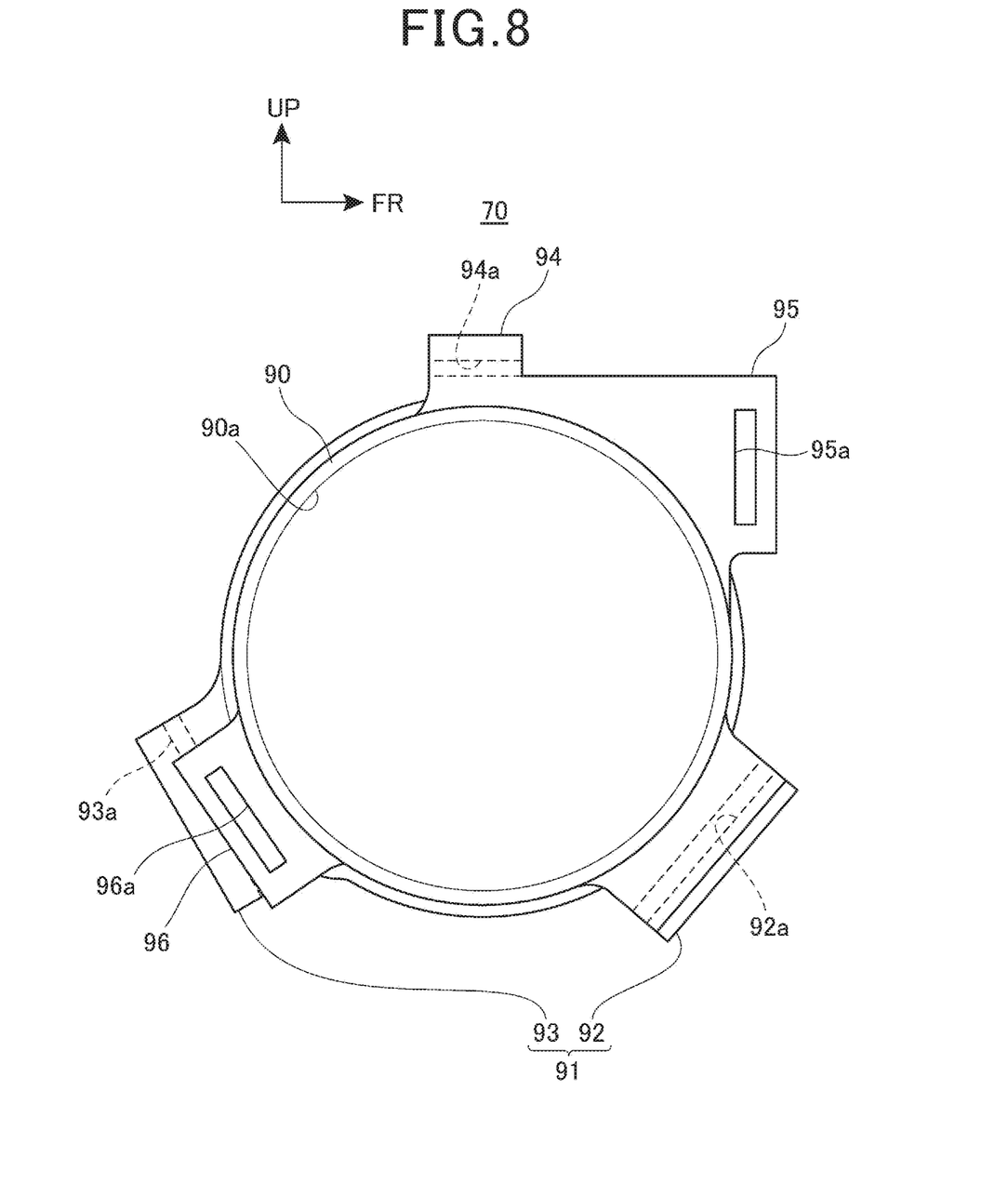
FIG. 8 is a side elevational view of the canister rubber as viewed from the right lateral side.
Figure 9:
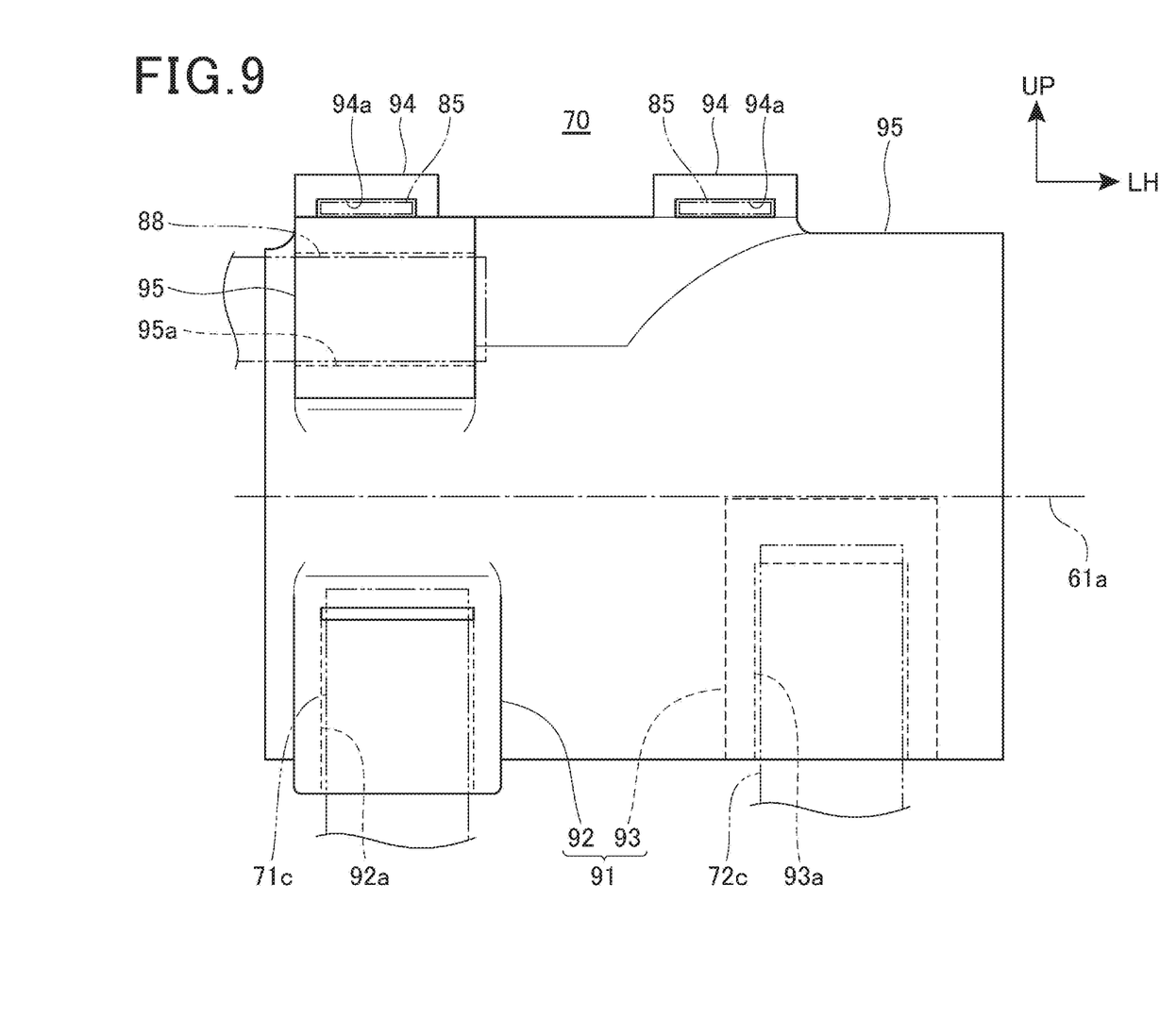
FIG. 9 is a front elevational view of the canister rubber as viewed from a front side.

FIG. 8 is a side elevational view of the canister rubber 70 as viewed from the right lateral side. FIG. 9 is a front elevational view of the canister rubber 70 as viewed from a front side.

Reference is made to FIGS. 6 to 9. The canister rubber 70 includes a cylindrical annular portion 90. The annular portion 90 has open axial end faces. The canister rubber 70 has an inner peripheral portion 90a fitting over an outer periphery of the outer cylinder 74 of the canister 61 to thereby be fixed onto the canister 61.

The canister rubber 70 has a vehicle body-side mounting portion 91. The vehicle body-side mounting portion 91 is disposed at a lower portion on an outer periphery of the annular portion 90. The vehicle body-side mounting portion 91 protrudes outwardly in a radial direction of the annular portion 90.

Specifically, the vehicle body-side mounting portion 91 includes an anterior-side mounting portion 92 and a posterior-side mounting portion 93. The anterior-side mounting portion 92 protrudes downwardly toward the front from the outer periphery of the lower portion at a front portion of the annular portion 90. The posterior-side mounting portion 93 protrudes downwardly toward the rear from the outer periphery of the lower portion at a rear portion of the annular portion 90.

The canister rubber 70 further includes a plurality of purge valve mounting portions 94, 94, an anterior-side guard mounting portion 95 (guard mounting portion), and a posterior-side guard mounting portion 96 (guard mounting portion). The purge valve mounting portions 94, 94 protrude superiorly from the outer periphery of the upper portion of the annular portion 90. The anterior-side guard mounting portion 95 protrudes anteriorly from the outer periphery of the upper portion at the front portion of the annular portion 90. The posterior-side guard mounting portion 96 protrudes downwardly toward the rear from the outer periphery of the lower portion at the rear portion of the annular portion 90.

The canister rubber 70 is an elastic member formed generally of rubber.

The canister rubber 70 is fixed to the vehicle body by the canister stay 69 engaging the vehicle body-side mounting portion 91.

The posterior-side mounting portion 93 of the canister rubber 70 has an insertion hole 93a. The posterior-side insert 72c of the posterior-side stay portion 72 is to be inserted in the insertion hole 93a. The insertion hole 93a extends, in a vehicle side elevational view, obliquely upwardly toward the rear along the posterior-side insert 72c. The posterior-side mounting portion 93 is disposed on the first side in the axial direction of the canister 61 on the side adjacent to the first-side lateral surface portion 75.

The anterior-side mounting portion 92 of the canister rubber 70 has an insertion hole 92a. The anterior-side insert 71c of the anterior-side stay portion 71 is to be inserted in the insertion hole 92a. The insertion hole 92a extends, in the vehicle side elevational view, obliquely upwardly toward the front along the anterior-side insert 71c. The anterior-side mounting portion 92 is disposed on the second side in the axial direction of the canister 61 on the side adjacent to the second-side lateral surface portion 76.

Specifically, the anterior-side mounting portion 92 and the posterior-side mounting portion 93 are disposed on the second side and the first side, respectively, in the axial direction with respect to an axial center of the canister rubber 70.

The purge valve mounting portions 94, 94 have engagement portion insertion holes 94a, 94a. The engagement portions 85, 85 of the purge valve 64 are to be inserted in the engagement portion insertion holes 94a, 94a. The engagement portion insertion holes 94a, 94a extend, in the vehicle side elevational view, in the fore-aft direction. The engagement portions 85, 85 pass through the engagement portion insertion holes 94a, 94a in the fore-aft direction.

The purge valve mounting portions 94, 94 are disposed on the first side and the second side, respectively, in the axial direction of the canister rubber 70 with respect to the axial center of the canister rubber 70.

The anterior-side guard mounting portion 95 has an anterior-side mounting tab insertion hole 95a (mounting tab insertion hole) formed at an anterior end portion thereof. The anterior-side mounting tab 88 of the guard 86 is to be inserted in the anterior-side mounting tab insertion hole 95a. The anterior-side mounting tab insertion hole 95a passes through the anterior-side guard mounting portion 95 in the axial direction of the canister rubber 70 (in the vehicle width direction).

The posterior-side guard mounting portion 96 has a posterior-side mounting tab insertion hole 96a (mounting tab insertion hole). The posterior-side mounting tab 89 of the guard 86 is to be inserted in the posterior-side mounting tab insertion hole 96a. The posterior-side mounting tab insertion hole 96a passes through the posterior-side guard mounting portion 96 in the axial direction of the canister rubber 70 (in the vehicle width direction).

The anterior-side guard mounting portion 95 and the posterior-side guard mounting portion 96 are disposed on ends of the canister 61 on the side adjacent to the second-side lateral surface portion 76 in the axial direction of the canister 61.

Reference is made to FIGS. 4 and 6 to 9. The canister 61 is mounted on the vehicle body by the anterior-side insert 71c and the posterior-side insert 72c of the canister stay 69 being inserted from below in the anterior-side mounting portion 92 and the posterior-side mounting portion 93, respectively, of the canister rubber 70.

The canister rubber 70 is formed of rubber and thus has a vibration damping property. The canister rubber 70 thus can effectively reduce vibration transmitted to the canister 61 from the vehicle body side.

A direction in which the anterior-side insert 71c is inserted with respect to the canister rubber 70 differs from, and is substantially orthogonal to, a direction in which the posterior-side insert 72c is inserted with respect to the canister rubber 70. This arrangement enables the canister rubber 70 to be rigidly fixed to the canister stay 69. Specifically, even when, for example, a force acts on the canister rubber 70 in a forward and upward direction in an attempt to pull the canister rubber 70 from the anterior-side insert 71c, the force does not act on the posterior-side insert 72c to be pulled out of the posterior-side mounting portion 93. The canister rubber 70 can thus be prevented from being displaced from the canister stay 69.

Additionally, the anterior-side stay portion 71 and the posterior-side stay portion 72 are formed separately from each other. This arrangement allows, when the canister rubber 70 is to be assembled with the canister stay 69, the anterior-side insert 71c and the posterior-side insert 72c to be individually inserted from different directions in the canister rubber 70. This enhances assemblability. In addition, the anterior-side stay portion 71 and the posterior-side stay portion 72 are jointly fastened to the vehicle body-side fixing portion 32c on the vehicle body side by the stay fixing bolts 73, 73. The canister stay 69 thus can be fixed in place by a simple structure.

Additionally, the anterior-side insert 71c extends obliquely upwardly toward the front from below the canister 61 and the posterior-side insert 72c extends obliquely upwardly toward the rear from below the canister 61, so that the anterior-side insert 71c and the posterior-side insert 72c form a V-shaped recess in the vehicle side elevational view. The canister 61 is disposed inside the V-shaped recess via the canister rubber 70. This arrangement results in the anterior-side insert 71c and the posterior-side insert 72c sandwiching the canister 61 in the fore-aft direction and supporting the canister 61 from below, so that the canister 61 can be rigidly supported.

Additionally, the posterior-side mounting portion 93 and the anterior-side mounting portion 92 of the canister rubber 70 are disposed to be spaced apart from each other, on the first side and the second side, respectively, in the axial direction of the canister 61. This arrangement enables the canister 61 to be supported over a wide range in the axial direction (vehicle width direction), so that the canister 61 can be rigidly supported.

The purge valve 64 is mounted on the upper surface of the canister rubber 70 by the engagement portions 85, 85 being inserted from the front side into the purge valve mounting portions 94, 94. The arrangement in which the purge valve 64 is supported using the canister rubber 70 that supports the canister 61 as described above eliminates the need for a support member dedicated to the purge valve 64, thereby simplifying the support structure. Additionally, the purge valve 64 is supported by the canister rubber 70 having a vibration damping property, so that vibration that can be transmitted from the vehicle body side to the purge valve 64 can be effectively reduced.

The upstream part 63a of the purge line 63 has an upstream end connected with the canister 61 supported by the canister rubber 70 and has a downstream end connected with the purge valve 64 supported by the canister rubber 70. Specifically, the purge line 63 has both ends supported by the vehicle body via the canister rubber 70. The foregoing arrangement allows vibration to be transmitted from the vehicle body side to the purge line 63 to be reduced, thus minimizing load acting on the purge line 63.

The guard 86 is mounted on the lateral portion of the canister rubber 70 by the anterior-side mounting tab 88 being inserted from a lateral side in the anterior-side guard mounting portion 95 and by the posterior-side mounting tab 89 being inserted from the lateral side in the posterior-side guard mounting portion 96. The guard 86 is disposed so as to cover the opening in an end face of the annular portion 90. The mounting of the guard 86 through the use of the canister rubber 70 allows the guard 86 to be mounted through a simple structure and vibration of the guard 86 to be reduced.

Reference is made to FIGS. 1, 3, and 7. The guard 86 is disposed, in the vehicle width direction, between the canister 61 and the exhaust pipe 38 and covers the second-side lateral surface portion 76 of the canister 61 from the side of the exhaust pipe 38. In the vehicle side elevational view, the guard 86 has an upper portion overlapping the exhaust pipe 38. The foregoing arrangements enable the guard 86 to reduce heat transmitted from the exhaust pipe 38 to the canister 61 and to protect the canister 61 from, for example, gravel.

As described above, in accordance with the embodiment to which the present invention is applied, the canister structure for the motorcycle 1 includes the canister 61 connected with the fuel tank 42 using the charge line 62, the canister 61 adsorbing the fuel vapor generated in the fuel tank 42, and the purge valve 64 disposed in the path through which the fuel vapor is returned from the canister 61 to the throttle body 40 of the engine 10. The canister structure includes: the annular canister rubber 70 that fits over the outer cylinder 74 of the canister 61; the canister stay 69 disposed on the vehicle body side; and the engagement portions 85, 85 disposed on the purge valve 64. The canister rubber 70 has, formed on the outer periphery thereof, the vehicle body-side mounting portion 91 having the insertion holes 92*a* and 93*a* in which the canister stay 69 is inserted and the purge valve mounting portions 94, 94 having the engagement portion insertion holes 94*a*, 94*a* in which the engagement portions 85, 85 of the purge valve 64 are inserted.

In the foregoing arrangements, the engagement portions 85, 85 of the purge valve 64 are inserted in the purge valve mounting portions 94, 94 of the canister rubber 70 that is used for mounting the canister 61 on the vehicle body side. Thus, vibration to be transmitted to the purge valve 64 can be reduced by the canister rubber 70 formed of rubber. Furthermore, the canister rubber 70 can be used for mounting the purge valve 64. This feature eliminates the need for a support member dedicated to the purge valve 64, so that the purge valve 64 can be supported by a simple structure.

The purge valve mounting portions 94, 94 are disposed on the upper portion of the canister rubber 70 and the vehicle body-side mounting portion 91 is disposed on the lower portion of the canister rubber 70. The canister stay 69 includes the anterior-side stay portion 71 that extends vertically at a position anterior to the canister 61 and the posterior-side stay portion 72 that extends vertically at a position posterior to the canister 61. The vehicle body-side mounting portion 91 includes the anterior-side mounting portion 92 in which the anterior-side stay portion 71 is inserted and the posterior-side mounting portion 93 in which the posterior-side stay portion 72 is inserted.

The foregoing arrangements result in the anterior-side stay portion 71 inserted in the anterior-side mounting portion 92 of the canister rubber 70 and the posterior-side stay portion 72 inserted in the posterior-side mounting portion 93 of the canister rubber 70 sandwiching the canister 61 in the fore-aft direction, so that the canister 61 can be rigidly supported. Additionally, the purge valve 64 can be supported through the use of a space superior to the canister rubber 70.

The anterior-side stay portion 71 extends from an inferior portion of the canister 61 obliquely upwardly toward the front and the posterior-side stay portion 72 extends from an inferior portion of the canister 61 obliquely upwardly toward the rear. The foregoing arrangement allows the anterior-side stay portion 71 that extends from the inferior portion of the canister 61 obliquely upwardly toward the front and the posterior-side stay portion 72 that extends from the inferior portion of the canister 61 obliquely upwardly toward the rear to sandwich the canister 61 in the fore-aft direction and to support the canister 61 from below, so that the canister 61 can be supported rigidly. Furthermore, the direction in which the anterior-side stay portion 71 is inserted in the canister rubber 70 differs from the direction in which the posterior-side stay portion 72 is inserted in the canister rubber 70. This arrangement can prevent the anterior-side stay portion 71 and the posterior-side stay portion 72 from being removed from the canister rubber 70.

The purge valve 64 is mounted on the upper portion of the canister 61 via the canister rubber 70 and the canister 61 is connected with the purge valve 64 by the purge line 63. The foregoing arrangement results in the canister 61 and the purge valve 64 connected together by the purge line 63 being supported by the canister rubber 70 formed of rubber. Thus, the vibration to be transmitted from the vehicle body side to the purge line 63 via the canister 61 and the purge valve 64 is transmitted via the canister rubber 70, so that vibration of the purge line 63 can be effectively prevented and load on the purge line 63 can be reduced.

The guard 86, which covers the canister 61, is disposed on an opening formed by the annular portion 90 of the canister rubber 70. The guard 86 has the anterior-side mounting tab 88 and the posterior-side mounting tab 89. The canister rubber 70 further includes, formed on the outer periphery thereof, the anterior-side guard mounting portion 95 that has the anterior-side mounting tab insertion hole 95*a* in which the anterior-side mounting tab 88 of the guard 86 is inserted and the posterior-side guard mounting portion 96 that has the posterior-side mounting tab insertion hole 96*a* in which the posterior-side mounting tab 89 of the guard 86 is inserted.

The foregoing arrangements allow the guard 86 to be mounted by the anterior-side mounting tab 88 and the posterior-side mounting tab 89 being inserted in the anterior-side guard mounting portion 95 and the posterior-side guard mounting portion 96, respectively, of the canister rubber 70, so that the guard 86 can be provided through a simple structure.

The vehicle body-side mounting portion 91 and the purge valve mounting portions 94, 94 protrude from the outer periphery of the canister rubber 70 outwardly in the radial direction. Because the vehicle body-side mounting portion 91 and the purge valve mounting portions 94, 94 protrude outwardly in the radial direction in this arrangement, spaces for providing the insertion holes 92*a* and 93*a* and the engagement portion insertion holes 94*a*, 94*a* can readily be obtained. It is noted that at least either one of the vehicle body-side mounting portion 91 and the purge valve mounting portions 94, 94 is required to protrude outwardly in the radial direction.

In addition, the anterior-side stay portion 71 and the posterior-side stay portion 72 are formed separately from each other. Thus, even in a configuration in which the direction in which the anterior-side stay portion 71 is inserted in the canister rubber 70 differs from the direction in which the posterior-side stay portion 72 is inserted in the canister rubber 70, the anterior-side stay portion 71 and the posterior-side stay portion 72 can be individually inserted in the canister rubber 70 and the canister rubber 70 can be easily assembled with the canister stay 69 in this arrangement. Additionally, the canister stay 69 is divided into the anterior-side stay portion 71 and the posterior-side stay portion 72 for simpler configuration and the canister stay 69 can be manufactured easily.

While the present invention has been particularly described with reference to a specific embodiment, it will be understood that the embodiment is not intended to limit the present invention.

While the embodiment has been described as applied to the motorcycle 1 as the saddle riding vehicle, the invention is also applicable to all types of saddle riding vehicles including three-wheel saddle riding vehicles having two front or rear wheels and four-or-more-wheel saddle riding vehicles.

DESCRIPTION OF REFERENCE SYMBOLS

1 Motorcycle (saddle riding vehicle)
10 Engine
40 Throttle body (air intake system)
42 Fuel tank
61 Canister
62 Charge line (connection line)
63 Purge line
64 Purge valve
69 Canister stay
70 Canister rubber
71 Anterior-side stay portion
72 Posterior-side stay portion
74 Outer cylinder
85 Engagement portion
86 Guard
88 Anterior-side mounting tab (mounting tab)
89 Posterior-side mounting tab (mounting tab)
90 Annular portion
91 Vehicle body-side mounting portion
92 Anterior-side mounting portion
92a, 93a Insertion hole
93 Posterior-side mounting portion
94 Purge valve mounting portion
94a Engagement portion insertion hole
95 Anterior-side guard mounting portion (guard mounting portion)
95a Anterior-side mounting tab insertion hole (mounting tab insertion hole)
96 Posterior-side guard mounting portion (guard mounting portion)
96a Posterior-side mounting tab insertion hole (mounting tab insertion hole)

The invention claimed is:

1. A canister structure for a saddle riding vehicle, including a canister connected with a fuel tank using a connection line, the canister adsorbing fuel vapor generated in the fuel tank, and a purge valve disposed in a path through which the fuel vapor is returned from the canister to an air intake system of an engine, the canister structure for a saddle riding vehicle, comprising:
an annular canister rubber that fits over an outer cylinder of the canister;
a canister stay disposed on a vehicle body side; and
an engagement portion disposed on the purge valve, wherein
the canister rubber has, formed on an outer periphery thereof, a vehicle body-side mounting portion having an insertion hole in which the canister stay is inserted and a purge valve mounting portion having an engagement portion insertion hole in which the engagement portion of the purge valve is inserted.

2. The canister structure for a saddle riding vehicle according to claim 1, wherein
the purge valve mounting portion is disposed on an upper portion of the canister rubber and the vehicle body-side mounting portion is disposed on a lower portion of the canister rubber,
the canister stay includes an anterior-side stay portion that extends vertically at a position anterior to the canister and a posterior-side stay portion that extends vertically at a position posterior to the canister, and
the vehicle body-side mounting portion includes an anterior-side mounting portion in which the anterior-side stay portion is inserted and a posterior-side mounting portion in which the posterior-side stay portion is inserted.

3. The canister structure for a saddle riding vehicle according to claim 2, wherein the anterior-side stay portion extends from an inferior portion of the canister obliquely upwardly toward a front and the posterior-side stay portion extends from an inferior portion of the canister obliquely upwardly toward a rear.

4. The canister structure for a saddle riding vehicle according to claim 1, wherein
the purge valve is disposed on an upper portion of the canister via the canister rubber, and
the canister is connected with the purge valve by a purge line.

5. The canister structure for a saddle riding vehicle according to claim 1, further comprising:
a guard disposed on an opening formed by an annular portion of the canister rubber, the guard covering the canister, wherein
the guard has a mounting tab, and
the canister rubber further includes, formed on the outer periphery thereof, a guard mounting portion that has a mounting tab insertion hole in which the mounting tab of the guard is inserted.

6. The canister structure for a saddle riding vehicle according to claim 1, wherein at least either one of the vehicle body-side mounting portion and the purge valve mounting portion protrudes from the outer periphery of the canister rubber outwardly in a radial direction.

7. The canister structure for a saddle riding vehicle according to claim 3, wherein the anterior-side stay portion and the posterior-side stay portion are formed separately from each other.

* * * * *